United States Patent [19]

Gassen

[11] Patent Number: 5,125,160
[45] Date of Patent: Jun. 30, 1992

[54] POWER TOOL INERTIA BRAKE

[75] Inventor: James R. Gassen, Charlotte, N.C.

[73] Assignee: Textron Inc., Providence, R.I.

[21] Appl. No.: 701,448

[22] Filed: May 15, 1991

[51] Int. Cl.⁵ .............................................. B27B 17/02
[52] U.S. Cl. ........................................ 30/382; 30/383
[58] Field of Search .................................. 30/381–383; 188/77 R, 166

[56] References Cited

U.S. PATENT DOCUMENTS

| 3,923,126 | 12/1975 | Bidanset | 188/77 W |
| 4,324,045 | 4/1982 | Hoppner et al. | 30/381 |
| 4,420,885 | 12/1983 | Todero | 30/381 |
| 4,553,326 | 11/1985 | West | 30/381 |

Primary Examiner—Douglas D. Watts
Attorney, Agent, or Firm—Perman & Green

[57] ABSTRACT

An intertial-manual actuating chain brake for a chain saw in which a mechanical integrator distinguishes between relatively long duration accelerations developed by a "kickback" producing impulse and normal operating accelerations associated with operational and vibratory forces. Occurrence of a "kickback" impulse, developing a force of required magnitude, direction, and duration causes a spring-mass accelerometer to change from a brake released to a brake applied condition, applying a braking torque to the saw chain. The accelerometer utilizes a pivotable hand guard as the actuating means. The hand guard also provides for manual operation. The hand guard is comprised of a housing and an inertia weight that is connected to the housing. The weight and type of inertia weight can be selected to provide the brake applied condition for a predetermined movement of the chain saw or for a predetermined type of chain saw. The inertia weight can be adjusted to adjust the accelerometer.

14 Claims, 2 Drawing Sheets

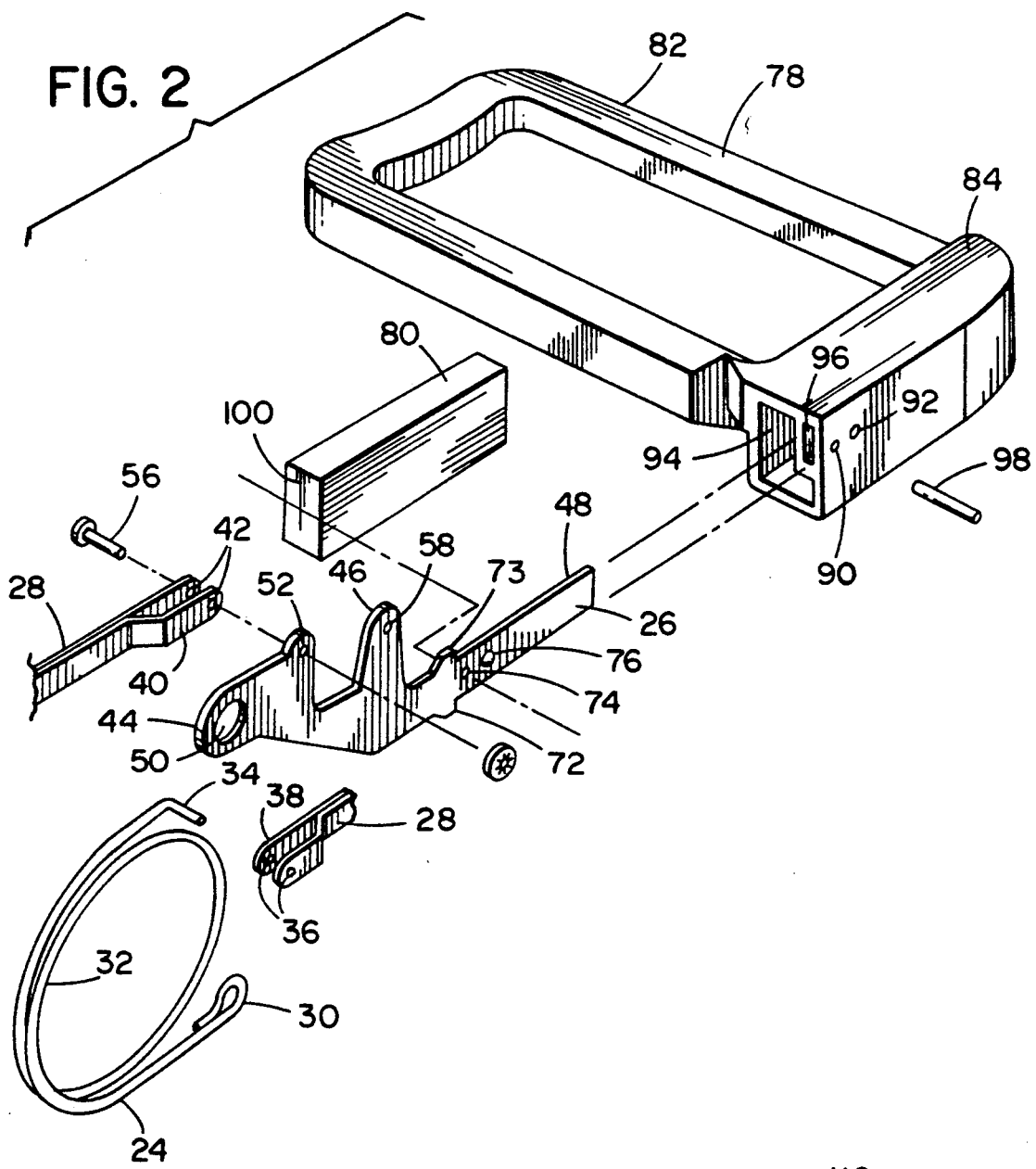
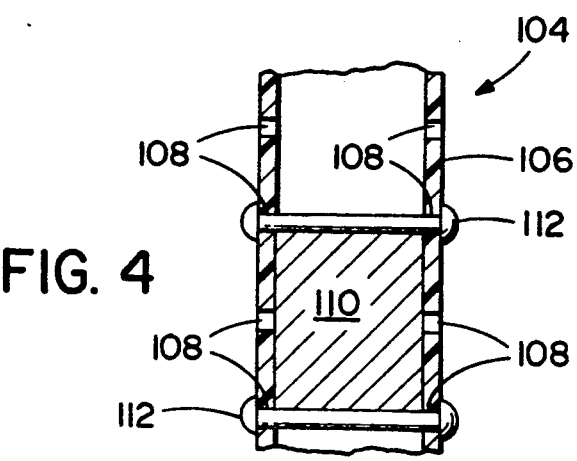
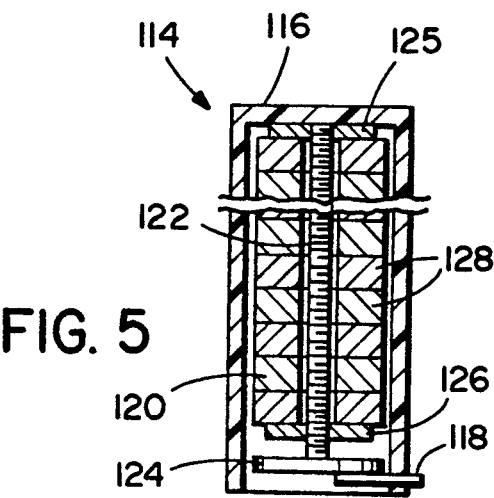

POWER TOOL INERTIA BRAKE

BACKGROUND OF THE INVENTION

1. Field of the Invention

The present invention relates to power tools and, more particularly, to an inertially actuated brake for a power tool.

2. Prior Art

Bidanset U.S. Pat. No. 3,923,126 discloses an inertial-manual actuated chain brake for a chain saw. As described in this prior art patent, the widespread use of portable power tools in the construction, lumbering, and consumer markets has emphasized the need for effective chain brakes. Lighter weight, reduced vibration, and higher power have resulted in very efficient cutting tools that are used in increasing applications by skilled and semi-skilled operators and, as with any powered machine, they present a potential hazard to the user. In the case of chain saws, a potential hazard is presented by the phenomenon known as "kickback." A "kickback" can be produced by a chain saw when the cutting elements on the chain momentarily stop cutting and is seized by the work material. The kinetic energy of the chain normally used to remove the material is suddenly transferred to the guide bar imparting a force to the guide bar that causes it to kick up; potentially towards the operator. Among other factors, the magnitude of the "kickback" force is generally related to the speed of the chain and the nature of engagement of the chain with the work material.

U.S. Pat. No. 3,923,126 relates to a chain brake that not only allows for manual braking, but also provides an inertia chain brake. This brake comprises the hand guard member of the chain saw being adapted to be moved relative to the rest of the chain saw in the event of a kickback of suitable acceleration and direction. This relative movement is caused by the inertia of the hand guard member.

A problem exists in the prior art in that hand-held power tools, such as a chain saw disclosed in U.S. Pat. No. 3,923,126 having acceleration activated inertia brakes using the weight of a hand guard as an inertia mass, requires that different hand guards be used for different types and models of tools, such as when comparing a large, long, and heavy chain saw versus a small, short and light chain saw. This, of course, can be expensive for a manufacturer having to design and to inventory all of these different types and models of hand guards.

Another problem that exists in the prior art is in regard to specifications dictated by governmental agencies. Because the governments of countries around the world have not adopted a uniform specification in regard to inertia brakes for power tools, there are different specifications for such tools throughout the world. Thus, even though a manufacturer may desire to sell the same model of power tool in two different countries, because of different specifications in such countries, it would be necessary to provide different hand guards for the same model power tool. In addition, because inertial-manual brakes for power tools are relatively new, some countries are still developing and modifying specifications. Thus, inertial-manual brake hand guards are constantly having to be redesigned to meet new or modified standards.

A further problem exists in the prior art in that inertial-manual brake hand guards in the past were made of a uniform material having a suitable density, such as metal, which is relatively expensive when compared to other materials, such as a thermoplastic material. In addition, the process of manufacturing such hand guards made of metal is more expensive when compared to thermoplastic molding techniques.

It is therefore an object of the present invention to provide a new and improved inertial-manual brake and hand guard for use with power tools.

SUMMARY OF THE INVENTION

The foregoing problems are overcome and other advantages are provided by a new and improved power tool inertia brake.

In accordance with one embodiment of the present invention, a chain saw is provided having a frame, a motor, a saw chain adapted to be driven by the motor on a guide bar, and a chain brake. The brake comprises a hand guard, an inertia weight, and means for applying a braking force. The hand guard is movably connected to the frame. The hand guard has a housing with a receiving cavity. The inertia weight is located in the receiving cavity. The means for applying a braking force can apply the force to movement of the saw chain upon movement of the hand guard to a predetermined position relative to the frame whereby the inertia weight can be selected to provide movement of the hand guard relative to the frame upon a predetermined movement of the chain saw.

In accordance with another embodiment of the present invention, a brake for a driver in a power tool is provided comprising means for automatically applying a braking force and means for adjusting an inertia switch. The means for automatically applying a braking force can apply the force to the driver of the tool and comprises a brake and an inertia switch. The switch is adapted to actuate the brake upon a predetermined movement of the power tool. The means for adjusting the inertia switch is adapted to vary the amount of predetermined movement necessary to actuate the brake.

In accordance with one method of the present invention, a method of assembling a chain brake for use with a power tool is provided. The method comprises steps of providing an inertia switch housing having an inertia weight receiving cavity; connecting the inertia switch housing to a frame of the power tool such that the housing can move relative to the frame; connecting a brake member to the inertia switch; and inserting an inertia weight into the housing receiving cavity whereby the chain brake is adapted to apply a braking force to a driven member of the power tool upon a predetermined accelerated movement of the tool and, the inertia weight can be suitably selected to actuate the chain brake upon a predetermined acceleration of the tool.

In accordance with another embodiment of the present invention, an inertial-manual brake hand guard for use with a power tool is provided. The hand guard comprises a housing, and an inertia mass. The housing has an inertia mass receiving cavity and is comprised of a thermoplastic material. The inertia mass is comprised of a relatively heavier material than the housing, and is located in the housing receiving cavity.

BRIEF DESCRIPTION OF THE DRAWINGS

The foregoing aspects and other features of the invention are explained in the following description, taken in connection with the accompanying drawings, wherein:

FIG. 2 is an exploded perspective view of portions of the chain saw shown in FIG. 1.

FIG. 4 is a partial schematic cross-sectional view of an alternate embodiment of the present invention.

FIG. 5 is a partial schematic cross-sectional view of an alternate embodiment of the present invention.

DETAILED DESCRIPTION OF THE INVENTION

Figure 1:
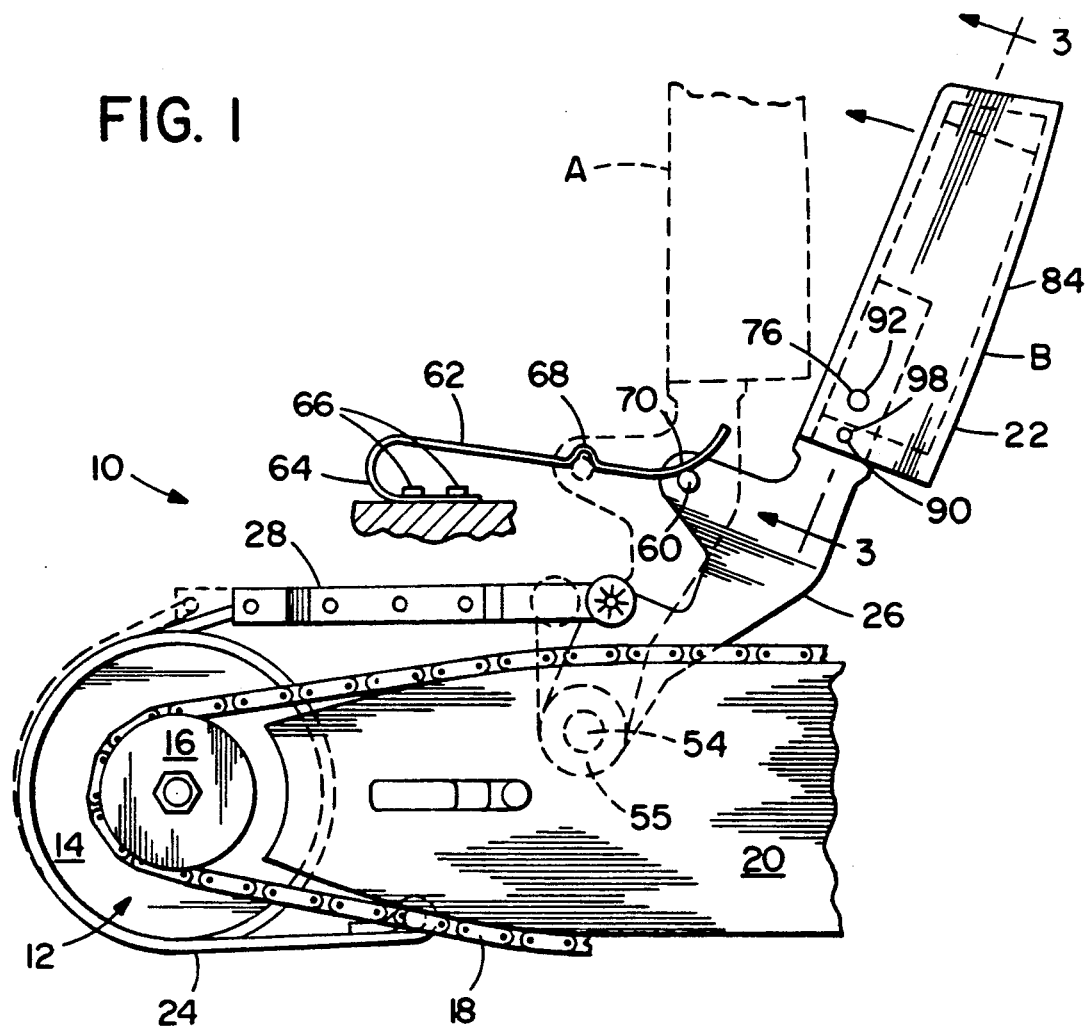
FIG. 1 is a schematic view of portions of a chain saw incorporating features of the present invention.

The present invention, as described with reference to the embodiments shown in the drawings, relates to an improvement in an inertial-manual actuated chain brake 10 for a chain saw. However, it should be understood that the present invention can be used with other types of tools or machines and, can be used merely as an inertial actuated brake not merely a combined inertial and manual actuated brake. A similar inertial-manual actuated chain brake for a chain saw is described in U.S. Pat. No. 3,923,126 which is hereby incorporated by reference in its entirety. Although the present invention will be described with reference to the embodiments shown in the drawings, it should also be understood that any suitable size, shape or type of elements or materials can be provided without departing from the spirit of the invention.

In the embodiment shown in FIG. 1, the chain saw generally comprises a motor (not shown) connected to a centrifugal clutch 12 having a drum 14 and sprocket 16. The centrifugal clutch has the characteristic that when the motor is running at an idling speed, the rotor (not shown) of the motor is disengaged from the drum 14 such that the drum 14, sprocket 16 and saw chain 18 are not driven. When the engine speed, controlled by the usual hand throttle trigger (not shown) exceeds a predetermined value, such as 3800 rpm, the centrifugal clutch engages with the rotor resulting in the drum 14, sprocket 16 and chain 18 being driven by the motor. The chain saw has a guide bar 20 for the saw chain 18 to ride upon. The bar 20 is fixedly, but removably connected to the chassis of the chain saw. The sprocket 16 has suitable teeth to engage with tangs in the saw chain 18 to drive the chain 18 on the bar 20.

Referring also to FIG. 2, the brake 10 generally comprises a hand guard 22, a brake member 24, a lever 26, and connecting member 28. The brake member 24, in the embodiment shown, is a band with a first end 30 that is fixedly connected to the chain saw chassis, a coiled middle section 32, and a second end 34. The band 24 is made of metal, however, any suitable material or combination of materials can be used. The first end 30 has a loop for a suitable fastener to be located to fix the first end 30 to the chassis.

The middle section 32 is about the same size as the drum 14 and is located around the outer perimeter of the drum 14. The drum 14 has a seat about its outer perimeter for locating the band 24. The second end 34 of the band 24 is adapted to be located in holes 36 at a rear end 38 of the connecting member 28 and be fixedly connected thereto.

The connecting member 28 is made of a suitable material, such as metal. The connecting member 28 also has a front end 40 with holes 42 adapted to be fixedly connected to the lever 26. In the embodiment shown, the connecting member 28 is actually comprised of two bars that are fixedly sandwiched together which allows the front and rear ends 40 and 38 to have a forked configuration. The forked rear end 38 allows the second end 34 of the band 24 to be received, at least partially, in the space of the fork such that the second member 28 can pivot relative to the band 24. Likewise, the forked configuration of the front end 40 allows the lever 26 to be received, at least partially, in the space of the fork such that the member 28 can pivot relative to the lever 26.

The lever 26 is comprised of a suitable material, such as metal, and generally comprises a bottom section 44, a middle section 46, and a top section 48. The bottom section 44 has a first hole 50 and a second hole 52. The first hole is adapted to have a fastener 54 positioned therein and a washer 55 to pivotally mount the lever 26 to the chain saw chassis. The second hole 52 is adapted to be positioned in the space of the forked front end 40 of the connecting member 28, aligned with the holes 42, such that the pin 56 can be positioned in the holes 42 and 52 to pivotally connect the two members together. The middle section 46 has a third hole 58 with a pin 60 fixedly located therein and extending therefrom. The top section 48 generally comprises two ledges 72 and 73, a fourth hole 74 and a protrusion 76.

The chain saw also has a locating leaf spring 62 comprised of a plate of resiliently deflectable material, such as metal. A first end 64 of the spring 62 is fixed by bolts 66 to the chain saw chassis. The spring 62 has a notch or recess 68 and a curved second end 70. The spring 62 pushes down on the pin 60. When the hand guard 22 and lever 26 are located in a home position A (shown in dotted lines in FIG. 1), the pin 60 is located in the notch 68 of the spring 62. This accomplishes two functions. First, the spring 62 and pin 60 cooperate to allow the hand guard 22 to be positively located at the home position A. Second, because the spring 62 must be deflected in order to move the pin 60 out of the notch 68, the spring 62 and pin 60 prevent the hand guard 22 from inadvertently moving from the home position A unless a predetermined force is applied to the hand guard 22. The curved second end 70 of the spring 62 cooperates with the pin 60 to keep the hand guard 22 in a forward braking position B shown in FIG. 1. Thus, once moved to the forward braking position B, the hand guard 22 is retained there until the operator of the chain saw pulls back on the hand guard 22 with sufficient force to deflect the spring 62 and allow the pin 60 to move back into the notch 68.

The hand guard 22, in the embodiment shown, is generally comprised of a frame 78 and an inertia weight 80. The frame 78, in the embodiment shown, is comprised of a unitary member comprised of a suitable material such as metal, nylon, or a polymer material. However, any suitable type of material could be used and any suitable number of members could be connected to each other to form the frame. The frame 78 has a first section 82 and a second section 84. The first section 82, in the embodiment shown, is sufficiently large to be positioned in front of the front handle (not shown) of the chain saw. In the event that the chain saw kicks up, the operator may be able to engage the hand guard 22 with his hand or wrist.

Figure 3:
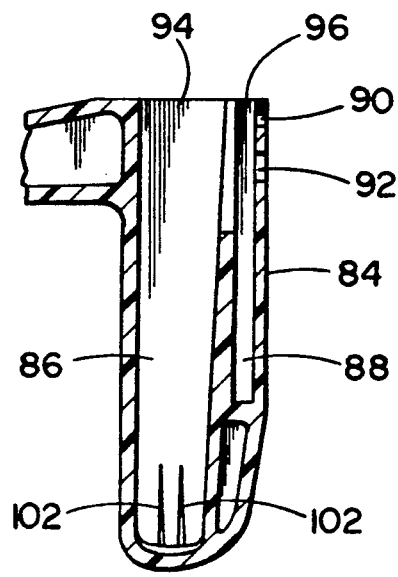
FIG. 3 is a cross-sectional view of the hand guard frame shown in FIG. 1 taken along line 3—3.

Referring also to FIG. 3, the second section 84, in the embodiment shown, generally comprises a weight receiving space 86, a lever receiving space 88, and two side holes 90 and 92. The weight receiving space 86 is generally enclosed by walls, but has an aperture 94 at the base of the frame 78. The lever receiving space 88 is likewise substantially enclosed by walls with an aperture 96 at the base of the frame 78. The lever receiving space 88 is suitably sized and shaped to receive the top section 48 of the lever 26 therein through the aperture 96. The ledges 72 and 73 stop the forward insertion of the lever 26 into the frame 78 by coming to rest upon the bottom of the frame 78. The protrusion 76 of the lever 26 causes the effective width of the lever 26 at the protrusion to be larger than the width of the lever receiving space 88. Thus, the frame 78 resiliently deforms as the protrusion enters the space 88 until the protrusion comes into alignment with the second side hole 92. When the protrusion 76 aligns with the second hole 92, the frame 78 is able to deflect back to its undeformed shape with the protrusion 76 being seated in the hole 92. This mounts or connects the lever 26 to the frame 78. The fourth lever hole 74 and first hole 90 of the frame 78 are adapted to receive a pin 98. When the lever 26 is connected to the frame 78, the two holes 74 and 90 align such that the pin 98 can pass therethrough. In the embodiment shown, the pin 98 is press fit into the holes 74 and 90. Although the pin 98 helps to keep the lever 26 connected to the frame 78, it also is used to lock the inertia weight 80 in the weight receiving space 86.

The inertia weight 80, in the embodiment shown, is generally comprised of a block of material such as aluminum or lead. However, any suitable type of material can be used. In addition, although the weight 80 is described as a block, this can include a solid member, a hollow or partially hollowed member, a shaped member, or a plurality of members. The function of the weight 80 is to give the hand guard 22 a certain mass and center of gravity. The weight 80 is inserted into the frame 78, through the aperture 94, prior to full insertion of the pin 98 into the frame 78. In the embodiment shown, the weight 80 and weight receiving cavity 86 are suitably sized and shaped such that the weight 80 can be substantially stationarily received in the cavity 86 with its base 100 located just inside the cavity 86 past the side hole 90. The frame 78 has crush ribs 102 at the interior of the cavity 86 that are adapted to be deformed or partially crushed by the weight 80 when it is inserted. This aids in stationarily positioning the weight 80 relative to the frame 78. When the pin 98 is inserted into the frame 78 it is positioned adjacent the base 100 of the weight 80 and thus blocks the path of the weight 80 from inadvertently exiting the cavity 86. Although a locking pin is described above, it should be understood that any suitable type of means for locking the weight 80 into the frame 78 could be provided.

The operation of the brake 10 is substantially similar to the operation of inertial-manual brakes in the prior art. The brake 10 can be actuated either manually by the operator or, substantially automatically due to a predetermined kickback of the chain saw.

The hand guard 22 is normally retained at position A during operation of the chain saw. In this position, the lever 26 holds the connecting member 28 in a rear position. The connecting member 28, in turn, pushes on the second end 34 of the brake member 24. Because the first end 30 of the brake member 24 is fixed to the chassis, the middle section 32 is retained in an enlarged shape such that it does not substantially interfere with rotation of the drum 14.

Manual actuation of the brake 10 merely comprises the operator pushing forward on the hand guard 22. This may occur intentionally or, due to the operator's hand or wrist hitting the hand guard 22 if the chain saw kicks up or back. Automatic actuation of the brake 10 can occur even if the operator does not push on the hand guard 22. Basically, the hand guard 22, spring 62 and lever 26 act as an inertia switch. This switch is activated by a kickback of the chain saw in a predetermined direction and a predetermined acceleration. Because the hand guard 22 is pivotally mounted to the chassis by the lever 26 and the hand guard 22 has a predetermined center of gravity offset from the pivot point, the hand guard 22 uses its inertia to overcome the holding force of spring 62 and stay substantially stationarily positioned while the rest of the chain saw is moved. Thus, the rest of the chain saw moves relative to the hand guard 22 resulting in the hand guard 22 having a relative actuated position B as shown in FIG. 1. As the relative position changes from position A to position B, the lever 26 pulls on the connecting member 28 which pulls on the second end 34 of the brake member 24. The curved second end 70 of the spring 62 also aids in the relative movement by pushing on the pin 60. Because the first end 30 of the brake member is fixed to the chassis, the middle section 32 is reduced in size. The brake member 24, because it surrounds the drum 14, tightens down on the outer perimeter of the drum 14 to apply a friction force to stop the drum 14 from rotating. The drive sprocket 16 thus stops which stops the chain 18 from being driven. The clutch 12 disengages from the rotor of the motor. The inertial-manual actuated chain brake has a mechanical integrator that distinguishes between relatively long duration accelerations developed by a "kickback" producing impulse and normal operating accelerations associated with operational and vibratory forces. This integrator includes the spring 62.

One of the principal features of the present invention is the adaptable nature or variable operational configuration of the hand guard 22. Because the hand guard 22 has a modular design with a separate frame and separate weight, various different types of weights can be used with various different types of frames. Thus, the hand guard can be adjusted or variably configured by providing an appropriate frame and weight. One example might include where a manufacturer desires to use the same type of frame on two different models of chain saws, each model having different kickback characteristics. In this situation, the present invention allows a single type of frame to be used by merely providing different types of inertia weights having predetermined masses and to provide a predetermined hand guard center of gravity to match the requirements for the different kickback characteristics. This modular adaptability is obviously more cost efficient than providing entirely different hand guards for different models. This is also a significant advantage if requirements imposed by governments are modified or changed. In addition, it allows each chain saw to be specifically configured to meet the various different foreign and domestic governmental requirements by merely providing an appropriate inertia weight and not having to provide wholly different hand guards for each product shipped to various different countries for different governmental requirements.

Referring now to FIG. 4, there is shown a schematic cross-sectional view of an alternate embodiment of the present invention. In the embodiment shown, the hand guard 104 has a frame 106 with a plurality of locking pin holes 108, an inertia weight 110, and two looking pins 112. In this embodiment the pins 112 and holes 108 can be used to position the weight 110 at different locations in the frame 106 to vary or select an appropriate center of gravity for the hand guard 104. Thus, the inertia weight can be positionally adjusted to vary the actuation of the inertia switch.

Referring to FIG. 5, there is shown a schematic cross-section view of another alternate embodiment of the present invention. In the embodiment shown, the hand guard 114 has a frame 116, a locking pin 118, and a weight assembly 120. The weight assembly 120 is comprised of a threaded rod 122, two end plates 124 and 125, a holding member 126, and a plurality of weights 128. In this embodiment, the weight assembly 120 can be adjusted by removing or adding weights 128. The end plate 125 can be unscrewed from the rod 122 for this purpose and the holding member 126 can be screwed on the rod 122 to stationarily sandwich the weights between the end plate 125 and holding member 126. The end plate 124 is used to cooperate with the pin 118 to stationarily position the assembly 120 in the frame 116. Of course, an operationally movable weight could also be provided.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A chain saw having a frame, a motor, a saw chain adapted to be driven by the motor on a guide bar, and a chain brake, the chain brake comprising:
   a hand guard movably connected to the frame, the hand guard having a housing with a receiving cavity;
   an inertia weight stationarily connected to the hand guard in the receiving cavity; and
   means for applying a braking force to movement of the saw chain upon movement of the hand guard to a predetermined position relative to the frame whereby the inertia weight can be selected to provide movement of the hand guard relative to the frame upon a predetermined movement of the chain saw.

2. A chain saw as in claim 1 wherein the hand guard is adapted to be manually moved to the predetermined position by an operator.

3. A chain saw as in claim 1 wherein the hand guard includes means for fixedly holding the inertia weight in the receiving cavity.

4. A chain saw as in claim 3 wherein the means for fixedly holding the inertia weight includes crush ribs inside the receiving cavity.

5. A chain saw as in claim 1 wherein the hand guard has an opening into the receiving cavity and the chain saw further includes means at the opening for preventing the inertia weight from exiting the receiving cavity.

6. A chain saw as in claim 5 wherein the means for preventing the inertia weight from exiting the receiving cavity can be moved to remove the inertia weight from the hand guard.

7. A chain saw as in claim 1 further comprising means for repositioning the inertia weight in the receiving cavity.

8. A chain saw as in claim 1 further comprising means for replacing the inertia weight with a different inertia weight.

9. A chain saw as in claim 1 wherein the inertia weight is comprised of a plurality of members that can be selectively used with the hand guard to provide predetermined weight.

10. An apparatus for applying a braking force to a driver in a power tool comprising:
    means for automatically applying a braking force to the driver of the tool comprising a brake and an inertia switch, the switch including a movable hand guard with an inertia weight connected thereto and, being adapted to actuate the brake upon a predetermined movement of the power tool; and
    means for adjusting the inertia switch to vary the amount of predetermined movement necessary to actuate the brake.

11. An apparatus as in claim to wherein the means for adjusting the inertia switch includes means for removing the inertia weight from the inertia switch and replacing it with a different second inertia weight.

12. A brake as in claim 10 wherein the inertia switch includes a movable hand guard with an inertia weight connected thereto.

13. An apparatus as in claim 10 wherein the means for adjusting the inertia switch includes means for connecting different inertia weights to an inertia weight holder of the switch.

14. An apparatus as in claim 10 wherein the means for adjusting the inertia switch includes means for moving the inertia weight relative to a pivot point of the switch.

* * * * *